3,411,867
METHOD OF REMOVING PHOSGENE FROM GASES

Ronald W. Beech and James T. Polley, Glen Dale, W. Va., assignors to Allied Chemical Corporation, New York, N.Y., a corporation of New York
No Drawing. Filed May 6, 1965, Ser. No. 453,821
7 Claims. (Cl. 23—2)

ABSTRACT OF THE DISCLOSURE

A novel process for removing phosgene from gas streams especially those containing relatively small quantities of phosgene, comprises contacting the gas streams with crystalline alumina in the presence of sufficient water to dissolve the HCl formed by the resulting conversion of phosgene.

---

Phosgene is a well known and important reagent in the synthesis of many organic chemicals. Currently considerable quantities of phosgene are consumed in the manufacture of organic polyisocyanates by which an amine or a mixture of amines is reacted with phosgene, usually in excess. A valuable by-product of this procedure is hydrogen chloride which is recovered from the off-gases emanating from the reaction. After removal of hydrogen chloride, the residual gas mixture comprising principally carbon dioxide and carbon monoxide together with trace amounts of phosgene is vented to the atmosphere. This gas mixture, however, contains a minor but hazardous quantity of phosgene which must be removed from the gas stream prior to venting. At present, this waste gas stream is scrubbed with aqueous caustic soda to remove phosgene. However, this procedure while effective in removing minor quantities of phosgene, also removes carbon dioxide which is present in relatively large amount. Such a procedure thus becomes costly and inefficient since the major amount of caustic is consumed in removing the less hazardous component carbon dioxide.

The removal of phosgene present as a contaminant from a variety of materials has been accomplished by various means. The removal of phosgene from chlorinated solvents by treatment with ammonia, from titanium tetrachloride by distillation, from boron trichloride by treatment with molten zinc, from inert gas mixtures by treatment with heated uranium, from hydrogen chloride by contact with ethylene dichloride, from waste gas mixtures by contact with water in the presence of activated carbon, are typical of methods used to accomplish this task. These known methods are either too costly or ineffective when applied to the waste gas stream containing major amounts of carbon dioxide and carbon monoxide. In particular, the use of activated carbon in the presence of water proved to be rather costly since the carbon was rapidly inactivated and required frequent and costly reactivation.

It is therefore an object of the present invention to provide an effective and economical procedure for decomposing phosgene present in waste gas mixtures.

Another object is to provide a process for removing phosgene from gas mixtures containing carbon dioxide and carbon monoxide in major amounts.

Other objects and advantages of the present invention will be obvious from the following description.

In accordance with the present invention, we have made the discovery that phosgene can be efficiently and economically removed from waste gas streams comprising an inert gas in major amount by contacting said gas stream with a solid comprising crystalline alumina and water in amount sufficient to dissolve substantially all of the hydrogen chloride formed by the hydrolysis of the phosgene. Preferably, the alumina is alpha alumina of the type conventionally used as a catalyst support material and the amount of water used is sufficient to form an aqueous hydrochloric acid solution of less than 5% by weight concentration.

Crystalline alumina, an activated form of aluminum hydroxide, is widely used as a support for catalysts. Two forms are available which differ mainly in the size of their crystals: (1) $\alpha$-alumina in which the crystals are no larger than one micron, and (2) $\beta$-alumina in which the crystals may attain a size up to ten microns. Preferably $\alpha$-alumina, which has a relatively large surface area compared to its mass, is used in the process of the present invention.

Numerous forms of crystalline $\alpha$-alumina are available commercially which are highly porous, refractory masses. One such product, Alumdum–Al–38 has been effectively employed in the process of this invention.

A general discussion of the preparation and utilization of the various forms of alumina is available in Kirk-Othmer-Encyclopedia of Chemical Technology, Second Edition, volume 2 (1963), Interscience Publishers.

The effectiveness of crystalline $\alpha$-alumina in the decomposition of phosgene in the presence of water is surprising in view of the statement in U.S.P. 2,800,518 in which alpha alumina is reported as "well known to be extremely inert both chemically and with respect to surface action." It was, therefore, surprising to discover that crystalline alpha alumina was highly effective in removing even traces of phosgene from waste gases in accordance with the present invention.

The process of this invention may be carried out by passing the phosgene-containing waste gas into a tower, filled at least partly, with crystallized $\alpha$-alumina, preferably in the form of discreet particles, and simultaneously introducing into the column a stream of water in such manner as to obtain substantial contact of the gas stream with the water in the presence of the alumina. In a preferred manner, the gas stream is introduced into the column at a point below the bed of alumina and the water is admitted at a point at or near the top of the column. The treated gas is emitted from the tower and passes through a gas analyzer to monitor the phosgene content prior to being vented to the air or gas recovery system while the water stream is vented from the tower at a point below the alumina packing and is sewered or recirculated to the tower. The water, after exiting from the tower, of course, contains some hydrochloric acid. Treatment of this water supply either by dilution with fresh water, with neutralizing agents, or other means for removing or lowering the acid content thereof is carried out prior to reuse so as to maintain the acid concentration below 5% by weight and preferably between about 1 and about 3% by weight. The temperature is not critical and desirably is below 100° C., preferably between 10–40° C.

Any device that provides gas-liquid contact may be used for the treatment of the phosgene containing gas stream. Although a tower arrangement is preferred, bubble plate columns, sieve plates and vessels equipped with efficient agitating means can be used. The equipment used should be acid resistant, e.g., rubber lined or coated with an acid resistant plastic material.

The amount of crystalline $\alpha$-alumina used can be varied considerably and will depend upon various parameters such as phosgene concentration in the gas stream, volume of the gas stream through the packing, i.e., contact time of gas stream with the $\alpha$-alumina, and volume of the water stream. Thus as the amount of phosgene contained in the waste gas stream is increased (or as the volume of the waste gas stream is increased) the amount of the $\alpha$-alumina packing should be increased or the volume of the water stream should be increased, or, preferably, both. Likewise as the unit volume of the α-alumina packing is increased, the volume of the phosgene containing gas stream can be increased.

The process of this invention is applicable to gas mixtures comprising phosgene as a contaminant from many sources. Thus in addition to mixtures of carbon dioxide and/or carbon monoxide with phosgene, mixtures comprising air, oxygen, hydrogen sulfide and other gases which are inert to water can be effectively and economically treated.

A particular advantage of the use of crystalline α-alumina in this invention resides in the observation that it apparently is not effected during use, that is, in contrast to activated carbon, the process does not have to be interrupted due to the failure of the reagents and reactivation of the material is not required.

The process is independent of the phosgene concentration of the gas stream. Complete removal is possible providing the velocity of the gas stream through the alumina is held below the critical velocity, that is the velocity at which phosgene is not completely removed from the gas stream. The critical velocity is a function of the packing depth and diameter, which parameters of course are limited only by spatial and cost considerations. If desired, two or more towers or equivalent treatment units may be placed in series and the gas stream passed, trainwise, through the several units. Such a system could be used to handle gas streams of relatively high phosgene content and gas stream velocity.

The following example will illustrate the process of the present invention.

EXAMPLE

A steel tower lined with Haveg 41 (a phenol formaldehyde resin impregnated with acid-washed asbestos) having the dimensions 15 inches ID (inside diameter) by 6 feet in height was packed with 3.29 feet of 4–6 mesh granules on crystalline α-alumina ("Alumdum Al–38") on top of a one foot layer of ceramic saddles. The tower was equipped with a gas inlet and liquid outlet ports at points in the tower below the packing and gas outlet and liquid inlet ports at points near or at the top of the tower. The rates of flow of both the gas stream and liquid are controlled by rotameters. The gas stream emanating from the tower passes through an automatic phosgene monitoring device. The liquid stream is circulated through the tower by means of a pump and the line has valves for bleeding off a portion of the stream and for introduction of fresh water into the circulating liquid as a means of controlling the acid content of the liquid.

A gas stream composed of a mixture of phosgene and air was admitted at the rate of 0.2 s.c.f.m. (Standard cubic feet per minute) of phosgene and 1.90 s.c.f.m. of air to the tower as 1630 lbs. of water per square foot cross-section of packing per hour were admitted to the tower. After 10.6 hours, the gas stream emanating from the column was still free from phosgene and the acid concentration of the circulating water was 2.01% HCl. For the succeeding 7.4 hours, the gas stream contained less than 1 p.p.m. (part per million) of phosgene while the acid concentration gradually increased to 3.42% HCl. When the acid concentration increased to 5.19% HCl, the phosgene content of the gas stream increased to about 2 p.p.m. Continuation of the run resulted in an increase of the acid concentration of the circulating liquid to 7.08% HCl, after 37 hours, and the phosgene content of the treated gas stream increased to about 10 p.p.m.

The liquid stream was sewered and replaced with fresh water. The fresh water was circulated through the tower. Within 5 minutes, the phosgene content of the gas stream exiting from the tower was less than 1 p.p.m. Thereafter sufficient fresh water was added to the liquid stream, while bleeding off an equal volume of the dilute acid liquor, to maintain the acid concentration of the liquor at about 1% by weight. The vent gases contained less than 1 p.p.m. of phosgene during this portion of the run which continued for one week.

It can thus be seen that an efficient and economical process for the removal of phosgene from waste gas streams has been devised.

The novel process has been illustrated by the above example which together with the numerous variations described in the above specification illustrate the scope of our invention. Other variations in the details set out herein will be obvious to those skilled in this art. Accordingly the present invention should not be limited to the details of the instant disclosure.

We claim:

1. A process for removing phosgene from gas containing the same which comprises contacting the gas containing phosgene with crystalline alumina in the presence of water to effect conversion of said phosgene and concomitant production of HCl, said water being in an amount sufficient to dissolve substantially all the HCl formed by the conversion of the phosgene.

2. The process of claim 1 in which the crystalline alumina is α-alumina.

3. The process of claim 1 in which sufficient water is used to maintain the concentration of hydrochloric acid below about 3% by weight.

4. A process for removing phosgene from gases containing the same which comprises passing said gases containing phosgene upwardly through and in contact with a bed of crystalline alumina wherein conversion of phosgene is effected with concomitant formation of HCl, discharging the gases free of phosgene from the top of the bed, concurrently passing water downwardly through the bed countercurrent to and in direct contact with the uprising gases, said water being in an amount sufficient to dissolve substantially all the HCl formed by the conversion of the phosgene, discharging the water containing dissolved HCl from the bottom of the bed, recycling the water to the top of the bed, and regulating the concentration of hydrochloric acid in the water to a value of less than 5% by weight.

5. A process as claimed in claim 4 wherein the concentration of the hydrochloric acid in the water is controlled by dilution with fresh water.

6. A process as claimed in claim 4 wherein the concentration of hydrochloric acid in the water is controlled by removal of hydrochloric acid by reaction with a neutralizing agent.

7. The process of claim 1 wherein the gas containing phosgene contains a major amount of inert gas.

References Cited

UNITED STATES PATENTS 2,832,670    4/1958    Wollthan _____ 23—154

OTHER REFERENCES

Richter, "Organic Chemistry," vol. I, Chemistry of the Aliphatic Series, 2nd Ed. 1919, P. Blokiston's Son & Co., Philadelphia, p. 430. Copy in Group 110, U.S.P.O.

OSCAR R. VERTIZ, Primary Examiner.

EARL C. THOMAS, Assistant Examiner.